United States Patent [19]

Caulfield et al.

[11] Patent Number: 4,655,539
[45] Date of Patent: Apr. 7, 1987

[54] HOLOGRAM WRITING APPARATUS AND METHOD

[75] Inventors: H. John Caulfield, Nagog Woods; Morton Camac, Lexington, both of Mass.

[73] Assignee: Aerodyne Products Corporation, North Billerica, Mass.

[21] Appl. No.: 664,392

[22] Filed: Oct. 23, 1984

Related U.S. Application Data

[63] Continuation-in-part of Ser. No. 485,828, Apr. 18, 1983, Pat. No. 4,498,740.

[51] Int. Cl.⁴ .............................................. G03H 1/10
[52] U.S. Cl. ..................................... 350/3.6; 350/3.66; 358/90
[58] Field of Search ................... 350/3.66, 3.6, 3.67, 350/320; 358/90, 2

[56] References Cited
U.S. PATENT DOCUMENTS
4,498,740  2/1985  Caulfield ................... 350/3.66

Primary Examiner—Bruce Y. Arnold
Attorney, Agent, or Firm—Frank A. Steinhilper

[57] ABSTRACT

An improved hologram writer writes a halogram from a three dimensional data stream or signal such as a signal corresponding to a scene, a picture, drawing or the like. A reference beam and an object or information beam are directed to a holographic recording member, and the information beam is focused through a point near the holographic recording member. A diverger means such as a diffuser, a lens array, a holographic element or the like adapted to form an expanding beam from a point image or spot receives a focused modulated information beam and directs it to the holographic recording member as a divergent beam. The beam may be sent directly to the recording member or it may be optically or otherwise relayed to the member. The point source may be in front of, behind or within the holographic recording member.

31 Claims, 7 Drawing Figures

HOLOGRAM WRITING APPARATUS AND METHOD

This is a continuation-in-part of Caulfield Application Ser. No. 485,828, filed 4/18/83, now U.S. Pat. No. 4,498,740.

BACKGROUND OF THE INVENTION

In Caulfield application Ser. No. 485,828 filed 4-18-83, now U.S. Pat. No. 4,498,740, there is described a three dimensional image system in which a hologram is written from an input signal such as a computer-generated signal or a television signal or the like, wherein object or information beams scan in three dimensions representing x, y, z coordinates, to present to a holographic recording medium small segments of an information beam corresponding to a three dimensional image. According to that invention, a resulting hologram may be created or written much faster and more efficiently than in the prior art.

In one embodiment of that invention, scanning mirrors scan a laser beam across a holographic medium in x and y coordinates and a lens scans in those dimensions and focuses in the third or z coordinate, the lens moving closer to or further from the holographic medium to express the third dimension. Such lens focuses the object or information beam close to the holographic medium, the point being closely adjacent in front of the medium, behind it, or even within it. With the focal point closely adjacent to the holographic medium, exposure of the individual elements of the medium is kept to small individual areas and not spread across the entire medium.

The present invention is an improvement over the invention in that prior patent application.

GENERAL NATURE OF THE INVENTION

According to the present invention, holographic information such as a three dimensional signal corresponding to a picture or scene or corresponding to a drawing or computer-generated three dimensional signal or the like is placed in a holographic information or object beam. This beam is scanned in two directions or two coordinates such as scanning in the x and y coordinates across a diverger or converger element such as, for example, a diffuser screen, a lenslet array, a Fresnel lens array, a hologram expander or the like to form a focussed spot incident on the diverger. The information emerges from the scanning spot as an expanding beam from that point on or near the diverger, which thus corresponds to an equivalent point source. The information beam is directed to a holographic medium, forming a point on or near the medium which is progressively moved closer to or further from the recording medium, thus acting to scan in the third dimension or z coordinate. This z coordinate scanning in one embodiment of the invention can be accomplished by moving the diverger closer to or further away from the holographic recording medium, or by moving the medium closer to or further away from the diverger element; and in another embodiment of the invention may be accomplished by positioning the diverger in a slanting relationship to the holographic recording medium so that certain portions of the two elements are closer together and other portions are further apart, and appropriately moving the medium or the diverger in the x-y plane. In this embodiment, where the two elements slant with respect to one another, z coordinate scanning may be achieved by scanning the beam to a position on the diverger closer to or further from the holographic recording medium and by providing translatory motion or scrolling to the recording medium.

Thus, in one embodiment of the invention, a diverger element is positioned closely adjacent to a holographic recording member and parallel thereto, and an element is moved to introduce relative motion beteen the diverger and the member to bring them closer together or further apart, thus achieving z coordinate scanning. In another embodiment of the invention the diverger is slanted with respect to the holographic recording member, and the z coordinate may thus be scanned by moving the location of the information beam on the diverger to bring such position closer to or further away from the holographic recording member. In a further embodiment of the invention, the spot of the information beam may be optically carried to or relayed to the holographic recording member, for example by a lenslet array such as a Fresnel lens array or the like, thus positioning the effective focal location of the information or object beam closely in front of, closely behind, or within the holographic recording medium. The resulting hologram may be a transmission hologram or a reflection hologram, as desired. The scanning motions may be continuous or stepped; thus, for example, motion in the z direction may be stepped to present to the holographic recording member a sequence of two dimensional or x, y scans. The object or information beam may be sent directly from the diverger element to a holographic recording medium or member or may be relayed to such member, for example by means of a Fresnel lens, a reflective lens, a refractive lens, a combination of lens elements, a lenslet array or a hologram predesigned to receive the expanding beam and relay it to a desired point near the holographic recording member, or by other relay means as desired.

The general nature of the invention having been set forth, the invention may be more fully understood in connection with the drawings, in which.

SPECIFIC DESCRIPTION OF THE INVENTION

Figure 1:
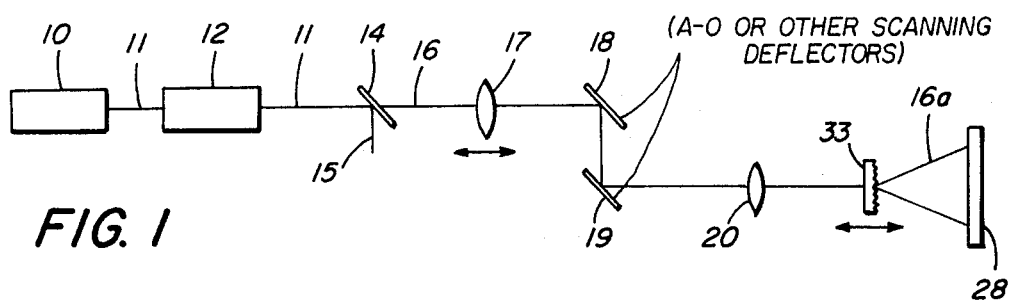
FIG. 1 is a diagrammatic functional view of the light path of an object beam in one form of the invention.
Figure 2:
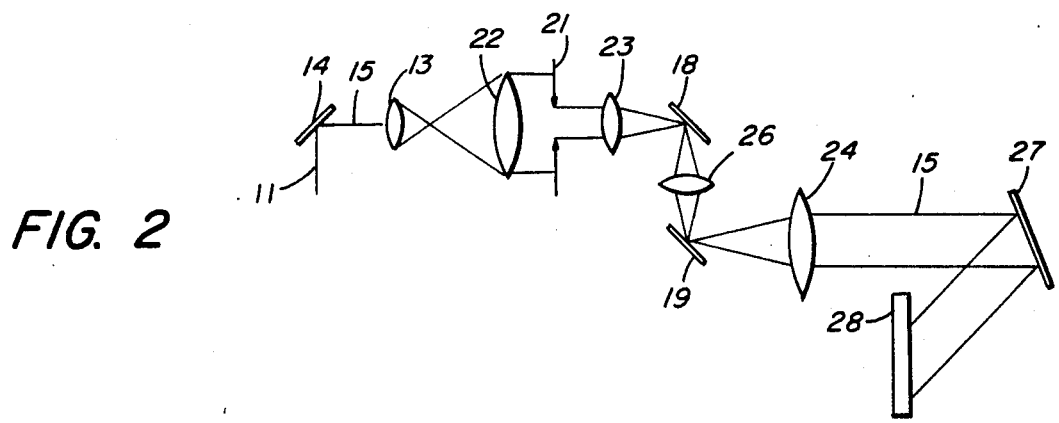
FIG. 2 is a diagrammatic functional view of the light path of a reference beam in one form of the invention.

In FIG. 1 is shown a diagrammatic illustration of the light path of an object beam or information beam according to one form of the invention, and in FIG. 2 is shown a similar illustration of the light path of a reference beam. These Figures are not intended to represent preferred embodiments of the invention but are intended to be functionally explanatory of a mechanism of the operation of the invention.

FIG. 1 shows a laser 10 or other source of radiation for hologram writing, directing a beam 11 to a modulator 12. The modulator passes beam 11 to a beam splitter 14 which splits beam 11 into a reference beam 15 and an information or object beam 16. FIG. 1 thereupon illustrates the object beam 16 passing to lenses 17 and 20 which send and focus beam 16 to a diverger element 33. The beam from lens 17 goes to a first scanner 18, which may be termed an x coordinate scanner, to a second scanner 19 which may be termed a y coordinate scanner, to a lens 20 which directs and/or focuses beam 16 to a diverger element 33, such as, for example a diffuser. Scanning mirrors such as scanners 18 and 19 are commercially available as "accousto-optical deflectors" or as "torsion mirrors" or as galvanometer mirrors or rotating or multiple mirrors or in other forms and devices.

The diverger element 33 is adapted to receive a beam 16 essentially at a point and send an expanding beam 16a to a holographic recording member 28. Alternatively it may receive a collimated beam and converge or diverge such beam. The x coordinate scanner 18 and the y coordinate scanner 19 cause beam 16 to be scanned across the area of diverger element 33, with the result that expanding beam 16a is scanned across the area of holographic recording member 28. Diverger element 33 is movable toward or away from member 28, representing a third or z coordinate scanner. Lens 17 moves with diverger element 33 to maintain beam focus on the diverger 33.

In FIG. 2 is shown the functional light path of the reference beam 15 emerging from beam splitter 14. This reference beam 15 goes to a lens 13 which sends beam 15 to a collimating lens 22. The collimated beam 15 goes to an iris 21 which adjustably controls the size of beam 15 according to the z scanning operations described in conjunction with FIG. 1 and later Figures. From iris 21, reference beam 15 is focussed to scanner 18 by a lens 23 and to scanner 19, through lens 26. This automatically registers the object and reference beams once they are aligned at any x-y position. In the preferred embodiment, scanners 18 and 19 are the same scanners as shown in FIG. 1. From y scanner 19, beam 15 goes to a collimating lens 24, to mirror 27 and to holographic recording member 28.

Figure 3:
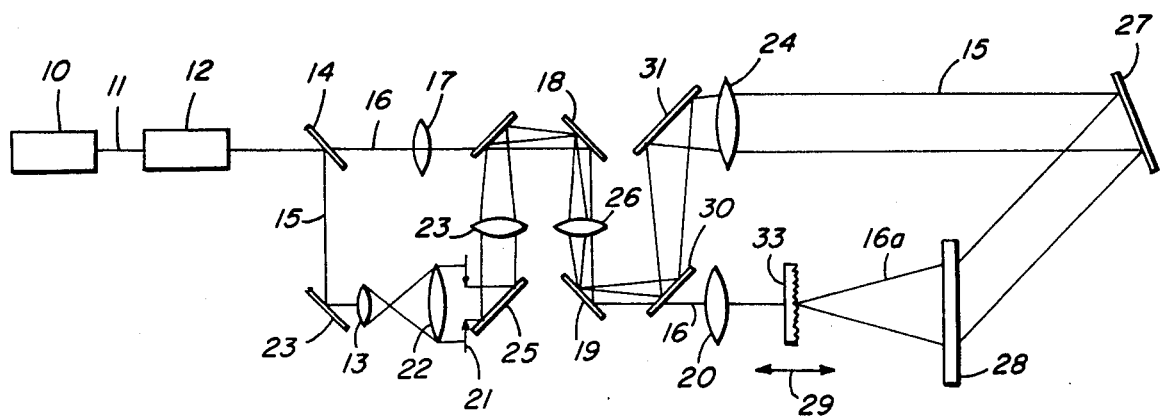
FIG. 3 is a diagrammatic view of hologram writing apparatus according to one embodiment of the invention.

In FIGS. 1 and 2, reference beam 15 arrives at the holographic recording member 28 from a direction opposite to the arriving direction of object beam 16, this also being in accordance with the showing in FIG. 3 and other Figures, thus forming a reflection hologram. As desired, this beam 15 may be directed to holographic recording member 28 from either side, thus forming a reflection hologram or a transmission hologram.

In FIG. 3 is shown diagrammatically an embodiment of the invention for writing a hologram quickly, in the time order of magnitude often referred to as "real time," using an input signal corresponding to holographic input information. Computer generation of such signals for holograms is well known in the art as are holograms from pictures, scenes, drawings and the like, all or any of which may be written according to this invention.

In FIG. 3, a laser 10 sends a beam 11 of coherent radiation to a modulator 12 and then to a beam splitter 14. From beam splitter 14 object beam 16 then proceeds through a path including a movable lens 17, to a first scanner 18 such as a torsion mirror acting to scan beam 16 in a first coordinate direction which may be called the x coordinate. From scanner 18 beam 16 is directed to a second scanner, shown as scanning mirror 19, optionally through a lens 26. This second scanner 19 scans in another direction which may be called the y coordinate, sending beam 16 to a lens 20 which focuses beam 16 onto a diverger element such as a diffuser 33. This diverger element or diffuser 33 operates to receive a light beam at a point and emit the beam in an expanding beam, as shown in FIG. 3 as expanding beam 16a, all in a manner well known in the art. For example, in Proceedings of the Society of Photo-Optical Engineers. April 1971, Vol. 25, pages 111 to 113 in an article entitled Developments in Holography, the preparation of diffusers is disclosed. Diffusers prepared according to that disclosure, for example, may be made by exposing a photographic plate or the like to expanding speckled radiation from ground glass or another diffusing member, and developing and bleaching the plate. Such a diffuser is characterized by diffusing a light beam, or creating an expanding beam of desired shape, and further does not effect a change in polarization of the light being diffused.

From diffuser 33 an expanding object beam 16a goes to a holographic recording member 28 where beam 16a reaches the member 28 in an expanding mode from the equivalent point source on the diffuser 33. As scanners 18 and 19 scan on the diverger element 33, beam 16 scans on the holographic recording member 28 in those two coordinates.

Reference beam 15 from beam splitter 14 is sent to a mirror 23 to collimating lenses 13 and 22, through an iris 21 to a mirror 25, and from mirror 25 to a focusing lens 23 and to first scanner 18. Iris 21 adjustably controls the size of beam 15, as will be discussed hereinafter. If desired, a spatial light modulator may be used to act as iris 21 and may act in reflective mode or other mode as desired. From first scanner 18, reference beam 15 goes to lens 26 and to second scanner 19. Second scanner 19 directs beam 15 to mirrors 30 and 31 and to collimating lens 24; and from lens 24 beam 15 is sent to mirror 27 which directs reference beam 15 to the holographic recording member 28. Lens 24 may be anamorphic if needed to modify the cross section of beam 15 to compensate for an angle at which beam 15 may reach holographic recording member 28 so that the scans of beams are correctly alligned, or may be a combination of lenses, as desired, to foreshorten beam 15 by the cosine of the angle at which it arrives or to otherwise modify the area of beam 15. As shown in this Figure, reference beam 15 arrives at holographic recording member 28 from the direction opposite to that of arriving object beam, forming a reflection hologram.

Diffuser 33 is movable toward and away from the holographic recording member 28 as indicated by arrow 29, and thus expanding object beam 16a reaches holographic recording member 28 from an equivalent point source which is moved closer to or further away from member 28, representing scanning in the third coordinate direction or in the z coordinate. As diffuser 33 scans closer to member 28, the area of beam 16a on member 28 becomes smaller, and as diffuser 33 scans further from member 28, representing a longer distance or longer z coordinate, beam 16a covers a larger area on member 28. Iris 21 contracts and expands synchronously with, or in unison with this scanning z coordinate, and beams 15 and 16a can thus be maintained substantially equal in size at holographic recording member 28 as the effective distance changes between the equivalent point source of beam 16 and the holographic recording member 28.

As is apparent to those skilled in the art, reference beam 15 and object beam 16 thus form a hologram at member 28; and when this hologram is played back by means of a playback reference beam, recreated object beam is seen to come from the various point sources of the expanding scanned object beam 16a, coming from the sources which are scanned in the three coordinates by scanners 18 and 19 and by the z-scanning diffuser 33.

Figure 4:
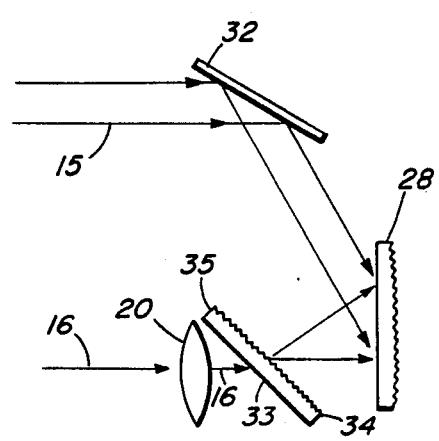
FIG. 4 is a fragmentary diagrammatic view of a portion of hologram writing apparatus according to another embodiment of the invention.

In FIG. 4 is shown a fragmentary portion of apparatus according to another embodiment of the invention. Here reference beam 15 reaches a mirror 32 from other elements of apparatus such as the apparatus of FIG. 3, such elements not being shown in FIG. 4. Mirror 32 directs reference beam 15 to the front face of holographic recording member 28. Informartion beam 16 reaches lens 20 in the same manner as shown in FIG. 3. The portions of the light path of beams 15 and 16 in this embodiment are the same up to mirror 32 and lens 20 as they are in FIG. 3. In FIG. 4, diffuser plate 33 is positioned close to holographic recording member 28 and is slanted with respect to member 28. As shown, one end of diffuser 33, shown as the lower end 34, is closer to member 28 and the other end, shown as upper end 35, is further away from member 28. Accordingly, as beam 16 is scanned lower or higher on diffuser 33, the z coordinate, or distance from the equivalent point source to member 28 is also scanned. According to FIG. 4, reference beam 15 is directed between slanted diffuser 33 and holographic recording member 28, coming to the holographic recording member 28 from the same side or face as the arriving object beam 16, to form a transmission hologram.

Figure 5:
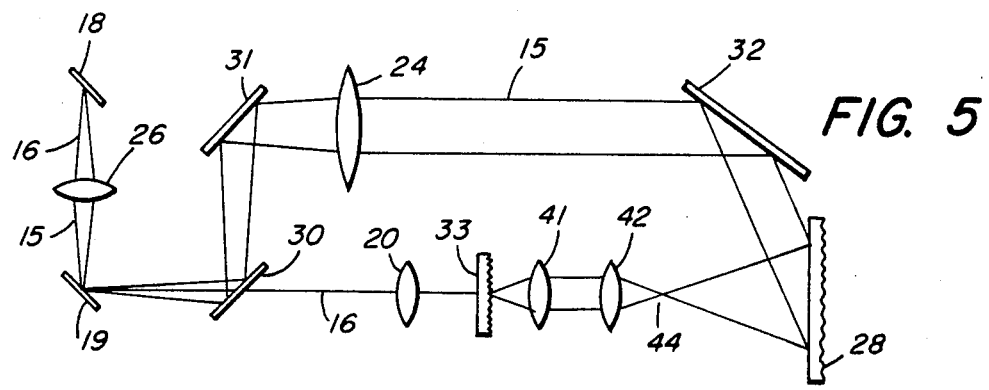
FIG. 5 is a fragmentary diagrammatic view of a portion of hologram writing apparatus according to a still further embodiment of the invention.

Synchronously with z coordinate scanning of beam 16 to positions on diffuser 33 which are closer to or further away from holographic recording member 28 and synchronously with the y coordinate scanning on diffuser 33, holographic recording member 28 is moved past or scrolled past the exposure position. The combination of x, y scanning of beam 16 across the slanted diffuser 33 and the scrolling of holographic recording medium 28 provides full three dimension scanning In FIG. 5 is shown a portion of another embodiment of the invention wherein the laser 10 of FIG. 3 and other optical elements of FIG. 3 through and including mirror 19 are in like position and operate in like manner. Beams 15 and 16 reach mirror 19 as in FIG. 3.

Object beam 16 goes from scanning mirror 19 to a lens 20 and thence to a diffuser 33. From diffuser 33, expanding object beam 16 is directed to lenses 41 and 42, and are focused through point 44, reaching holographic recording member 28 as an expanding beam 16a from equivalent point source 44. Point 44 may be on either side of member 28, or in the scanning movement may move through member 28 and be within member 28 for certain z coordinate positions. Lenses 41 and 42 thus act as transfer or relay lenses to transfer the effective point source on diffuser 33 to equivalent point source 44. Lens 41 and/or lens 42 may be a Fesnel lens or other lens such as a dielectric lens or the like, or may be a hologram predesigned to act as lenses to focus beam 16a through point 44. Desirably, diverger element 33 and lens 41 are structurally joined together and are essentially a single structural element movable in unison. Lens 24 may be one or more lenses so that lens 24 inverts the reference beam 15 if lenses 41 and 42 act to invert object beam 16. If needed, to compensate for horizontal vs. vertical dimensions with a tilted or untilted diverger element, such compensation may be built into a holographic diffuser element in a manner known to the art.

Diverger element 33 may be a diffuser as described hereinbefore, or may be a lenslet array, a predesigned hologram adapted to receive a spot of light and to pass therefrom an expanding light beam as from an equivalent point source, or may be other diverger element as desired. If desired, a predesigned holographic diverger 33 or holographic mirror 31 or 32 may adjust the relative height or width of beam 15 or 16, as will be apparent to those skilled in the art.

Figure 6:
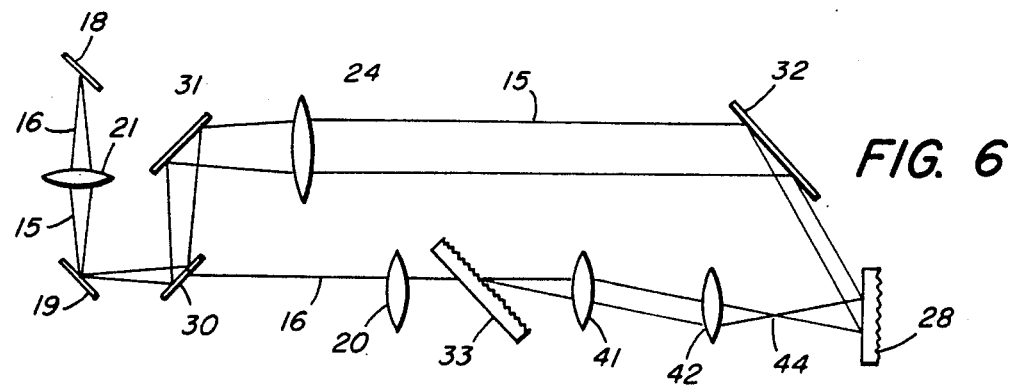
FIG. 6 is a diagrammatic view of a portion of holographic writing apparatus according to a still further embodiment of the invention.

In FIG. 6 is shown a portion of a hologram writing apparatus, being the portion comparable with that shown in FIG. 5. In FIG. 6, diverger element 33 is slanted with respect to Fresnel lenses 41 and 42 and may be structurally joined thereto. Beam 16 travels from diverger element 33 to Fresnel lens 41, to second lens 42 and is focused at point 44, as in FIG. 5. As beam 16 is scanned to positions on diverger element 33 closer to or further away from Fresnel lens 41, point 44 is moved toward or away from holographic recording member and may be in front of, behind, or within member 28. Desirably, member 28 is scrolled to obtain full x, y, z coverage. At member 28, reference beam 15 is sent from mirror 32 to join object beam 16 in the usual holographic manner. As shown in this FIG. 6, reference beam 15 arrives from the same side as object beam 16, writing a transmission hologram.

Figure 7:
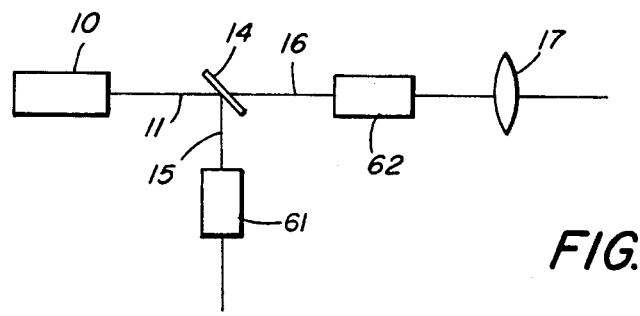
FIG. 7 is a diagrammatic view of a portion of hologram writing apparatus according to an embodiment of the invention adapted to form holograms in shades of gray.

In FIG. 7 is shown a laser 10, such as the laser in previous Figures, directing a beam 11 to beam splitter 14. Reference beam 15 travels from beam splitter 14 to a first light modulator 61, thence to other elements of apparatus such as lens 23 of FIG. 3, and continuing through scanners 18 and 19 to holographic recording member 28, as in FIG. 3. From beam splitter 14, object or information beam 16 is directed to a second light modulator 62 and then to lens 17 and to other elements of FIG. 3, including scanners 18 and 19 and then going to holographic recording member 28, as in FIG. 3. Modulators 61 and 62, positioned to operate separately on beams 15 and 16, provide various intensities, known in the art as shades of gray.

As in FIG. 3, iris 21 provides a reference beam of controlled diameter to be directed to holographic recording member 28 synchronously with the z coordinate scanning of the object beam 16. If desired, laser 10 may be pulsed, and in conjunction with a modulator, as for example modulator 62 of FIG. 7 operating on the object beam, will supply shades of gray.

I claim:
1. Apparatus for hologram writing comprising
   a source of a holographic signal,
   a laser,
   a modulator adapted to impart signal information from said source to a beam from said laser,
   a beam splitter, positioned to receive said beam from said laser, said beam splitter being adapted to split said laser beam into an information beam and a reference beam,
   scanning means adapted to scan said laser beam in two coordinates,
   means to direct both said reference beam and said information beam to said scanning means, a holographic medium adapted and positioned to receive a reference beam and an information beam and to form a hologram therefrom, means to direct said reference beam to said holographic medium, said reference beam thereby scanning across said holographic medium in said two coordinates, a diffuser element adapted to receive a beam and form therefrom a light beam expanding from the equivalent of a point on said element, means to direct said information beam from said scanning means to said diffuser element effectively at a point which is scanned across said diffuser element in two coordinates, means to direct said expanding beam from said diffuser element to said holographic medium, and means to change the effective distance of separation of the diffuser point source of said expanding beam from said holographic medium, thereby effectively providing scanning of said point source in the third coordinate.

2. The apparatus of claim 1, wherein said diffuser element and said holographic medium are positioned parallel with one another and wherein said means to change the effective distance of separation comprpises means to move at least one of said diffuser element and said holographic medium with respect to one another.

3. The apparatus of claim 1, wherein said diffuser element is mounted in a position slanted at a substantial angle with respect to said holographic medium, whereby said diffuser element point source is moved closer to and further away from said holographic medium as the position of said information beam is moved on said diffuser element.

4. The apparatus of claim 1, said means to direct said expanding beam including an optical relay means positioned and adapted to receive said expanding information beam from said diffuser element and to form an equivalent point source of said information beam from said diffuser element, said formed point source being closely adjacent to said holographic medium.

5. The apparatus of claim 1, said means to direct said expanding beam including a lens positioned and adapted to receive said expanding information beam from said diffuser element and to focus said information beam at a point closely adjacent to said holographic medium.

6. In a hologram writer adapted to write a holographic record of an object beam and a reference beam from input signals corresponding to x, y, z coordinates, the improvement comprising mounting means for a holographic recording member, a source of a narrow beam of coherent radiation, a diffuser element adapted to transform a point of light from said source to an expanding light beam, an object beam scanner adapted and positioned to receive a light beam from said source and to scan said beam as essentially a moving point on said diffuser element to form an expanding object beam, a reference beam scanner adapted and positioned to receive a beam of coherent radiation and scan said beam on said recording member, relaying means positioned to receive said expanding object beam and to relay said beam to said holographic recording member, and means to move said holographic recording member with respect to said diffuser element.

7. The apparatus of claim 6, wherein said object beam scanner and said reference beam scanner are mechanical scanners.

8. The apparatus of claim 6, wherein at least one of said scanners is an accousto-optical scanner.

9. The apparatus of claim 6, wherein at least one of said scanners includes a spatial light modulator.

10. The apparatus of claim 6, wherein said diffuser element is a lens array.

11. Apparatus according to claim 6, wherein said relaying means comprises at least two lenses positioned and arranged sequentially along the path of said expanding beam to direct said beam to said holographic recording member.

12. Apparatus according to claim 6, wherein said relaying means is a dielectric lens.

13. Apparatus according to claim 6, wherein said relaying means is at least one Fresnel lens.

14. Apparatus according to claim 6, wherein said relaying means is at least one holographic lens.

15. In the apparatus of claim 6, said object beam scanner and said reference beam scanner being positioned and adapted to direct said beams to opposite sides of said holographic recording means to produce a reflection hologram.

16. In the apparatus of claim 6, said object beam scanner and said reference beam scanner being positioned and adapted to direct said beams to the same side of said holographic recording member to produce a transmission hologram.

17. In the apparatus of claim 6, said holographic recording member and said diffuser element being positioned parallel with one another.

18. Apparatus according to claim 17 having means to move said holographic recording member and said diffuser element relative to one another, whereby motion between said member and said element varies the length of the light path therebetween.

19. In the apparatus of claim 6, said holographic recording member and said diffuser element being positioned to slant at a substantial angle with respect to one another, whereby different positions along said diffuser element represent different distances from said holographic recording member.

20. Apparatus according to claim 19, whereby motion between said holographic recording member and said diffuser element varies the length of the light path therebetween.

21. Apparatus according to claim 6 wherein the means to move said holographic recording member with respect to said diffuser element is adapted to vary the length of the light path between said diffuser element and said holographic member and wherein motion therebetween is adapted to be continuous motion.

22. Apparatus according to claim 6 wherein the means to move said holographic recording member with respect to said diffuser element is adapted to vary the length of the light path between said diffuser element and said holographic recording member and wherein motion therebetween is adapted to be stepped motion.

23. In a hologram writer adapted to write a holographic record of an object beam and a reference beam from input signals corresponding to x,y,z coordinates, the improvement comprising mounting means for a holographic recording member, a source of a narrow beam of coherent rediation, a diffuser element adapted to transform a point of light from said source to an expanding light, an object beam scanner adapted and positioned to receive a light beam from said source and to scan said beam as effectively a moving point on said diffuser element in positions corresponding to three coordinates, means to direct said expanding object beam to said holographic recording member, a reference beam scanner adapted and positioned to receive a beam from said source and to scan said beam on said holographic recording member, means to vary the size of said reference beam in coordination with the size of said object beam at said holographic recording member, and means to move one of said holographic recording member and said diffuser element with respect to one another to vary the beam distance therebetween.

24. A hologram writer according to claim 23, wherein the size and relative shape of said reference beam at said holographic recording member conforms with the size and relative shape of said object beam at said holographic recording member.

25. Apparatus according to claim 23 having a spatial light modulator adapted to modulate the size of said reference beam.

26. Apparatus according to claim 23 having modulating means adapted to simultaneously modulate the intensities of both the reference beam and the object beam, whereby said hologram writier is enabled to produce holograms having shades of gray.

27. A method of writing holograms from input signals of three dimensional graphic information comprising forming from said input signals an object beam having a small diameter substantially equivalent to a point source and directing said object beam to a movable point on a diffuser element, thereby producing an expanding object beam emanating from a position on said diffuser element as an diffuser point source, and scanning said object beam on said diffuser element in two directions corresponding to x and y coordinates, directing to a holographic recording member the emanating object beam from said diffuser element and scanning the distance between said equivalent point source and said holographic recording member to correspond to a scanning z coordinate, simultaneously directing a coherent reference beam to said holographic recording member and synchronously scanning said reference beam in the x and y coordinate directions in unison with said object beam on said holographic member, and adjustably maintaining the diameter of said reference beam at said holographic recording member of a size substantially equal to the size of said expanding object beam on said holographic recording member.

28. The method of claim 27 wherein one of said holographic recording member and said diffuser element is moved with respect to the other of said member and element in the z coordinate direction.

29. The method of claim 27, wherein said equivalent point source on said diffuser element is relayed optically to a movable point close to said holographic recording member and said movable point is moved in the Z coordinate direction with respect to said holographic recording member.

30. The method of claim 27, wherein said small diameter substantially equivalent point source is scanned in said z coordinate direction to positions in front of said holographic recording member, behind said holographic member and within said holographic recording member.

31. In a method of hologram writing wherein an information-containing object beam and a reference beam are simultaneously scanned across a holographic recording member, the improvement comprising scanning an object beam as substantially a point in two coordinate directions on a diffuser element to form a diverging object beam from a scanning equivalent point source on said diffuser element, directing said beam to a holographic recording member from said point source, thereby scanning said expanding object beam on said member in two coordinate directions, varying the distance between said point source and said holographic recording member to represent a varying third coordinate direction, and simultaneously scanning said reference beam on said holographic recording member synchronously with said scanning object beam and controlling the area and shape of said reference beam synchronously with the area and shape of said expanding object beam as the size of said expanding object beam varies with the distance between said point source and said holographic recording member.

* * * * *